United States Patent [19]
Lu

[11] Patent Number: 5,406,739
[45] Date of Patent: Apr. 18, 1995

[54] FISHING SINKER OF IRON MATERIAL AND METHOD OF MAKING SAME WITHOUT DIE CASTING

[76] Inventor: Pang-Chou Lu, No. 22, Chun Fu Lane, Siu Swei Hsiang, Changhoa, Taiwan, Prov. of China

[21] Appl. No.: 72,124

[22] Filed: Jun. 7, 1993

[51] Int. Cl.⁶ ............................................. A01K 91/00
[52] U.S. Cl. ..................................... 43/44.9; 43/44.89
[58] Field of Search ................. 43/44.81, 44.9, 44.89, 43/44.96, 43.1, 44.91

[56] References Cited

U.S. PATENT DOCUMENTS

| | | | |
|---|---|---|---|
| 83,681 | 11/1968 | Albee | 43/44.81 |
| 2,526,031 | 10/1950 | Kocarek | 43/44.9 |
| 2,611,988 | 9/1952 | Gibson | 43/44.96 |
| 2,695,587 | 11/1954 | Welter | 43/44.96 |
| 3,999,325 | 12/1976 | Folker | 43/44.81 |
| 4,649,663 | 3/1987 | Strickland | 43/44.9 |
| 4,942,689 | 7/1990 | Link et al. | 43/44.9 |
| 5,222,321 | 6/1993 | Lu | 43/42.53 |

FOREIGN PATENT DOCUMENTS 0595177 6/1959 Italy ..................................... 43/44.9
2207841 2/1989 United Kingdom ............... 43/44.81

Primary Examiner—P. Austin Bradley
Assistant Examiner—James Miner
Attorney, Agent, or Firm—Browdy and Neimark

[57] ABSTRACT

The invention relates to a fishing sinker of iron material that is either cylindrical, with an elongate or tapered construction having a through hole for passing therethrough a fishing line, or mostly spherical with a slit for holding a fishing line, and a method of making a fishing sinker of iron material without the use of die casting comprising the steps of: (a) cutting on a punching tool an iron bar to form an iron blank of a predetermined length; (b) transferring the iron blank to a second position on the punching tool, whereon the iron blank is punched a straight hole at one end thereof or respectively at both ends thereof; (c) punching to enlarge the straight hole; (d) punching a through hole along a longitudinal axis of the iron blank so that the iron blank becomes a cylindrical blank; and (e) forging the cylindrical blank on the punching tool so that the cylindrical blank is stretched out to form a fishing sinker having therein a through hole to receive a fishing line.

2 Claims, 1 Drawing Sheet

FISHING SINKER OF IRON MATERIAL AND METHOD OF MAKING SAME WITHOUT DIE CASTING

FIELD OF THE INVENTION

The present invention relates generally to a fishing sinker, and more particularly to a method of making a fishing sinker of iron material without die casting.

BACKGROUND OF THE INVENTION

In general, a conventional fishing sinker is made of lead material by die casting. Such a fishing sinker can be easily molded to have a variety of shapes in view of the fact that lead is a relatively soft metal and that lead has a great specific gravity. However, lead is a heavy metal hazardous to the human health and can not be easily excreted once it is ingested by the human body. Accidental ingestion of lead into the body of a worker making such a fishing sinker can take place from time to time. In addition, animals, such as birds and fishes, are vulnerable to lead poisoning, which is often fatal. In other words, lead is a potentially dangerous source of environmental pollution, which is getting worse day by day. However, the public is becoming increasingly aware of and concerned about the ecological problems brought about by man-made pollution. In response to such public concern, the applicant of the present invention has successfully developed a fishing sinker made of iron instead of lead, as exemplified in the U.S. patent application Ser. No. 07/946,708 filed by this applicant and later issued as U.S. Pat. No. 5,222,321.

The conventional fishing sinker of lead is generally provided with a through hole large enough to permit a fishing line to pass therethrough. Such a through hole can be made integrally with the lead sinker. However, as far as a fishing sinker of iron is concerned, it is not possible to make economically an iron fishing sinker with an integrally made through hole by punching or forging. The cost of making an iron fishing sinker with a through hole made by drilling can be so high that fishermen are bound to resist using such a sinker. At the present time, a lead fishing sinker with a slender through hole can be made at a low cost only by die casting. In other words, the method of making an iron fishing sinker having a slender through hole at a low cost is not available. In addition, an iron fishing sinker with a slit, in which the fishing line is held, can not be made economically in quantity.

SUMMARY OF THE INVENTION

It is therefore the primary objective of the present invention to provide a method of making a fishing sinker of iron without die casting. The method is automated and intended for making in quantity the iron fishing sinker, which is of cylindrical construction or conical construction and is provided centrally with a slender through hole for a fishing line to pass therethrough.

It is another objective of the present invention to provide a method of making a fishing sinker of iron without die casting. The method is automated so as to produce economically in quantity the iron fishing sinker provided with a slit in which a fishing line is held.

The foregoing objectives of the present invention are accomplished by a method comprising the steps of: (1) cutting an iron bar to form an iron blank of a predetermined length by means of a cutting tool; (2) transferring the iron blank from a first position on the cutting tool to a second position of the cutting tool, where the iron blank is punched at the center of one end thereof or both ends thereof a straight hole of an appropriate depth by means of a punching spindle; (3) transferring the punched iron blank to a third position on the cutting tool, where the punched iron blank is further punched a large through hole along the longitudinal axis thereof by means of another punching spindle having an outer diameter greater than an outer diameter of an ordinary fishing line hole; and (4) transferring the iron blank, which is provided with a large through hole, to a fourth position on the cutting tool, where the iron blank is forged so that the cylindrical wall of the iron blank is extended to form an outer edge of a fishing sinker and that the large through hole is made smaller in its inner diameter so as to become a small fishing line hole. As a result, a fishing sinker of cylindrical construction is made in the automated process described above. In addition, the process described above can be also employed to make a fishing sinker blank with a round head. Such a blank is annealed before a slit of an appropriate depth is made in the round head of the sinker blank.

DETAILED DESCRIPTION OF THE INVENTION

Figure 1:
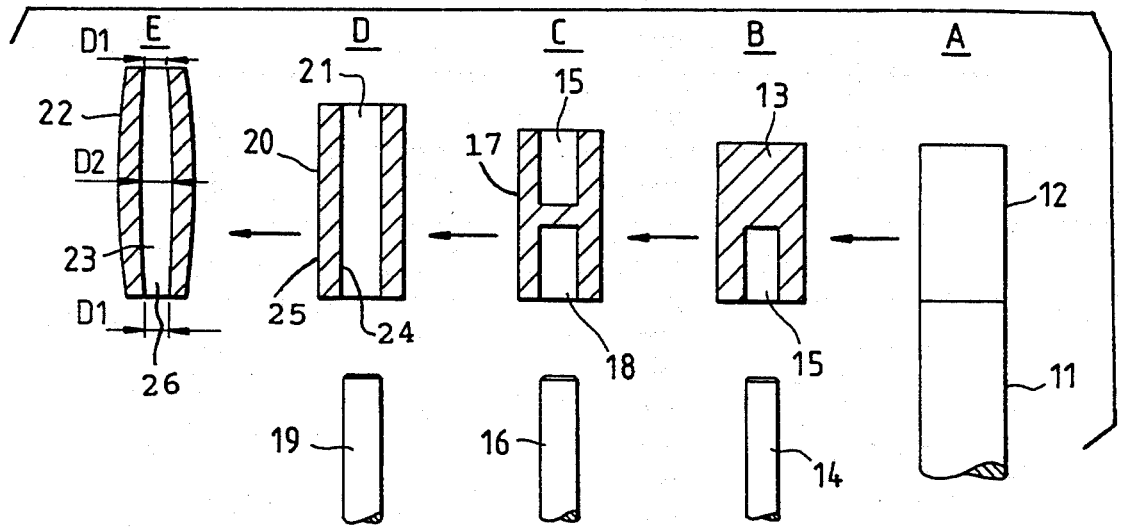
FIG. 1A–1E are schematic views showing a method of making a fishing sinker of iron material without die casting, according to a first preferred embodiment of the present invention.

Referring to FIG. 1, the first preferred embodiment of the present invention is shown to comprise an elongate bar 11 of iron material. The first step of making a fishing sinker involves a process of cutting the bar 11 to form a blank 12 of a predetermined length. The process of cutting the bar 11 takes place on an (A) position of a punching tool (not shown in the drawing.) The second step includes a process of transferring the blank 12 to a (B) position of the punching tool, on which the blank 12 is punched at the center of one end thereof a straight hole 15 of an appropriate depth by means of a punching spindle 14. As a result, a blank 13 with a straight hole 15 is formed. The third step comprises a process of transferring the blank 13 to a (C) position of the punching tool, where the blank 13 is rotated for an angle of 180 degrees so as to permit another end of the blank 13 to be punched another straight hole 18 by means of another punching spindle 16. As a result, a blank 17 with two straight holes 15 and 18 is formed. In the fourth step, the blank 17 is sent to a (D) position of the punching tool, where the blank 17 is punched along the longitudinal axis thereof a through hole 21 by means of a punching spindle 19 and is subsequently forged to become a cylindrical blank 20 having an inner 24 and outer 25 cylindrical surface. In the fifth step, the cylindrical blank 20 is transferred to an (E) position of the punching tool, where the cylindrical blank 20 is forged to stretch out to become an elongate cylindrical sinker 22 having a concave inner surface 26 and a convex outer surface 27, the inner surface 26 forming a slender through hole 23 of arcuate construction with two opposing openings or ends, each of a diameter (D1) less than an internal diameter D2 and so dimensioned as to permit a fishing line to pass therethrough. In the meantime, the density of the elongate cylindrical sinker 22 is so increased that the specific gravity of the sinker 22 becomes greater.

As described above, part of the iron bar 11 is automatically transferred in sequence from the A position through the E position and is finally made into an elongate cylindrical fishing sinker 22 having a slender through hole 23 for the fishing line to pass therethrough. Such a manufacturing process as described above can be employed to make economically the fishing sinker 22 of iron material in quantity.

Figure 2:
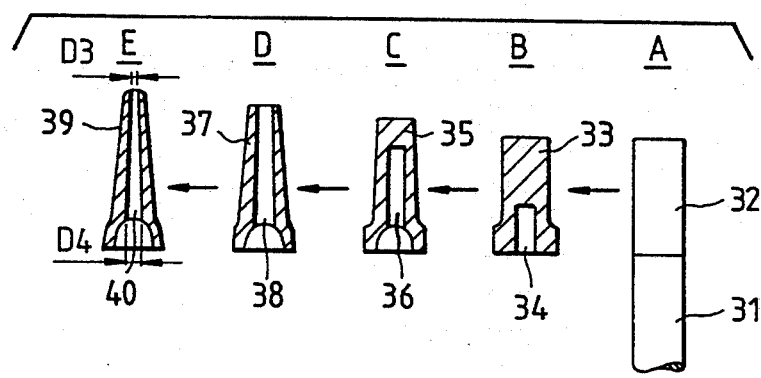
FIG. 2A–2E are schematic views showing a second preferred embodiment of making a fishing sinker of iron material without die casting, according to the present invention.

As shown in FIG. 2, the second embodiment of the present invention comprises an elongate iron bar 31, which is cut to form a blank 32 at an (A) position of a punching tool (not shown in the drawing.) Subsequently, the blank 32 is moved to a (B) position of the punching tool, where the blank 32 is processed to become a blank 33 with a stepped surface. The blank 33 is punched at one end thereof a straight hole 34 and is then sent to a (C) position of the punching tool, where a straight hole 36 is punched in the blank 35 before the blank 35 is transferred to a (D) position of the punching tool, where a tapered through hole 38 is punched in the blank. Finally, the blank 37 having the tapered through hole 38 is moved on to an (E) position of the punching tool, where the blank 37 is forged to stretch out to become a tapered fishing sinker 39 with a through hole 40 of tapered construction having two opposing openings or ends with one opening having a diameter D3 for a fishing line to pass therethrough. The diameter of a portion of tapered through hole 40 increases linearly from the opening of diameter D3 to a point more than halfway along the longitudinal axis of the tapered cylindrical sinker having a diameter D4. The tapered fishing sinker 39 can be made in quantity at a low cost.

Figure 3:
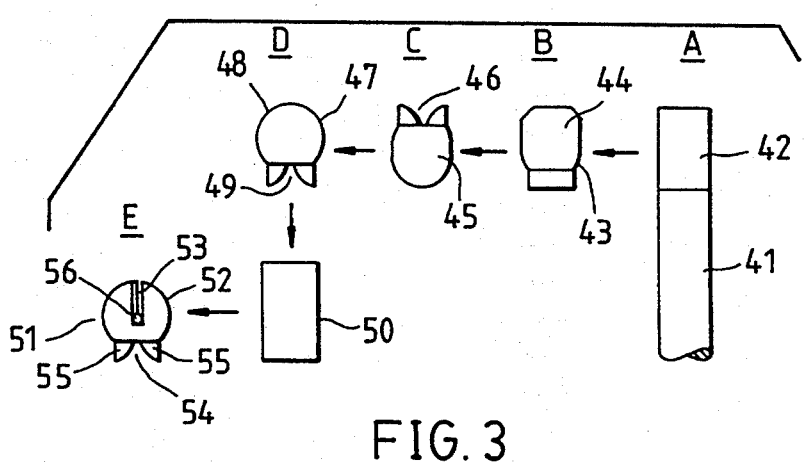
FIG. 3A–3E are schematic views showing a third preferred embodiment of making a fishing sinker of iron material without die casting, according to the present invention.

The third embodiment of the present invention is illustrated in FIG. 3, in which an iron bar 41 is shown to be located at an (A) position of the punching tool (not shown in the drawing.) In the first step, the iron bar 41 is cut at the (A) position to form a blank 42 of a predetermined length. In the second step, the blank 42 is sent to a (B) position of the punching tool, where the blank 42 is forged to form a blank 43 having a head 44. The third step involves a process of transferring the blank 43 to a (C) position of the punching tool, where the blank 43 is so turned around as to facilitate the formation of a notch 46 in another end of the blank 43. As a result, a blank 45 with a notch 46 is formed. In the fourth step, the blank 45 is moved on to a (D) position of the punching tool, where the blank 45 is so molded as to form a blank 47 having a spherical head 48 located at one end thereof and a V-shaped opening 49 located at another end thereof. The blank 47 is then treated with an annealing process 50 so as to form a slit-type fishing sinker 51 having a spherical head 52 provided with a slit 53 dividing equally the spherical head 52. Since the fishing sinker 51 has already been annealed and softened, the slit 53 can be caused to widen by exerting a pressure with fingers on two slanted pieces 55 forming a notch 54. As a result, a fishing line 56 can be inserted into the slit 53. The fishing line 56 can be held securely in the slit 53 by exerting a pressure with fingers on the spherical head 52 so that the slit 53 retains the fishing line 56 securely therein. The production of the slit-type fishing sinker 51 can be also automated so that the sinker 51 is made in quantity at a relatively low cost.

The embodiments of the present invention described above are to be regarded in all respects as merely illustrative and not restrictive. Accordingly, the present invention may be embodied in other specific forms without deviating from the spirit thereof. The present invention is therefore to be limited only by the scope of the following appended claims.

What is claimed is:

1. A fishing sinker made of iron material and manufactured without die casting, comprising a cylinder having a concave inner surface, said concave inner surface forming an arcuate through hole having two opposing openings of equal diameter, each said opening diameter being smaller than an internal diameter of said arcuate through hole at a point along the longitudinal axis of said arcuate through hole.

2. A fishing sinker made of iron material and manufactured without die casting, comprising:

a spherical head having a slit disposed to partially divide said spherical head into two equal parts; and
two slanted pieces disposed on said spherical head opposite said slit, said slanted pieces forming a V-shaped notch for causing said slit to widen under applied force to both of said slanted pieces so as to allow the insertion of a fishing line into said slit, said slit being dimensioned to securely hold a fishing line therein under applied force to said spherical head.

* * * * *